(12) United States Patent
Dudley et al.

(10) Patent No.: US 11,574,423 B2
(45) Date of Patent: Feb. 7, 2023

(54) AUGMENTED REALITY (AR) OBJECT COMMUNICATION AND INTERACTION SYSTEM AND METHOD

(71) Applicant: BOOMANITY CORP., San Antonio, TX (US)

(72) Inventors: Jane Dudley, San Antonio, TX (US); Michael Fredrick Hines, Savannah, GA (US); Maximiliano Knox Laguna, San Juan, PR (US)

(73) Assignee: BOOMANITY CORP. A DELAWARE CORPORATION, San Antonio, TX (US)

( * ) Notice: Subject to any disclaimer, the term of this patent is extended or adjusted under 35 U.S.C. 154(b) by 0 days.

(21) Appl. No.: 17/589,875

(22) Filed: Jan. 31, 2022

(65) Prior Publication Data

US 2022/0245865 A1 Aug. 4, 2022

Related U.S. Application Data

(60) Provisional application No. 63/143,678, filed on Jan. 29, 2021, provisional application No. 63/191,325, (Continued)

(51) Int. Cl.
*G06T 11/00* (2006.01)
(52) U.S. Cl.
CPC .................... *G06T 11/00* (2013.01)
(58) Field of Classification Search
CPC ....... G06T 11/00; G06T 19/006; G02B 27/01; H04N 13/00
See application file for complete search history.

(56) References Cited

U.S. PATENT DOCUMENTS 8,831,255 B2 9/2014 Crawford et al.
8,953,889 B1* 2/2015 Worley, III ....... G06F 16/24556
455/457

(Continued)

FOREIGN PATENT DOCUMENTS

WO 2010079876 A1 7/2010

OTHER PUBLICATIONS

AR Enabled IoT for a Smart and Interactive Environment: A Survey and Future Directions—https://www.mdpi.com/1424-8220/19/19/4330/htm.

(Continued)

*Primary Examiner* — Said Broome
(74) *Attorney, Agent, or Firm* — Jason P. Webb; Pearson Butler

(57) ABSTRACT

An improved augmented reality object handling system, including: a display device; a camera functionally coupled to the display such that visual data from the camera is displayed on the display; an augmented reality object, including rendering data configured to provide instructions for displaying the AR object on the display; behavior instructions, the behavior instructions including interaction instructions for how the AR object interacts with visual data from the camera and/or other AR objects; and a characteristic interaction broker in communication with the AR object, wherein the interaction broker loads into memory interaction instructions from associated AR objects, tracks positions of associated AR objects, and triggers interactions based on loaded interaction instructions, characteristics, and tracked positions.

17 Claims, 7 Drawing Sheets

Related U.S. Application Data filed on May 20, 2021, provisional application No. 63/223,702, filed on Jul. 20, 2021.

(56) References Cited

U.S. PATENT DOCUMENTS

| | | |
|---|---|---|
| 9,292,085 B2 | 3/2016 | Bennett et al. |
| 9,536,352 B2 | 1/2017 | Anderson |
| 9,952,820 B2 * | 4/2018 | Anderson .............. G06T 19/006 |
| 10,008,037 B1 * | 6/2018 | Worley, III ............... G06T 7/00 |
| 10,019,846 B1 * | 7/2018 | York ........................ A63F 13/00 |
| 10,062,213 B2 | 8/2018 | Mount et al. |
| 10,137,374 B2 | 11/2018 | Miller et al. |
| 10,140,317 B2 | 11/2018 | McKinnon et al. |
| 10,143,925 B2 | 12/2018 | Middleton |
| 10,489,931 B1 * | 11/2019 | Kinstner .................. G06F 3/011 |
| 10,551,993 B1 * | 2/2020 | Sanocki .................. G06F 3/017 |
| 10,719,993 B1 | 7/2020 | Ha |
| 2012/0231887 A1 | 9/2012 | Lee et al. |
| 2013/0178257 A1 | 7/2013 | Langseth |
| 2017/0243403 A1 | 8/2017 | Daniels et al. |
| 2018/0157317 A1 | 6/2018 | Richter et al. |
| 2020/0183565 A1 | 6/2020 | Cronholm |

OTHER PUBLICATIONS

Augmented Reality Agents with Pervasive Awareness, Appearance, and Abilities (ARA)—https://sreal.ucf.edu/projects/ara/.
Towards Pervasive Augmented Reality: Context-Awareness in Augmented Reality—https://ieeexplore.ieee.org/document/7435333.

* cited by examiner

AUGMENTED REALITY (AR) OBJECT COMMUNICATION AND INTERACTION SYSTEM AND METHOD

CROSS REFERENCE TO RELATED APPLICATIONS

This invention claims priority, under 35 U.S.C. § 120, to the U.S. Provisional Patent Application No. 63/143,678 to Jane Dudley filed on Jan. 29, 2021, as well as claims priority, under 35 U.S.C. § 120, to the U.S. Provisional Patent Application No. 63/191,325 to Jane Dudley filed on May 20, 2021, as well as claims priority, under 35 U.S.C. § 120, to the U.S. Provisional Patent Application No. 63/223,702 to Jane Dudley filed on Jul. 20, 2021, all of which are incorporated by reference herein.

BACKGROUND OF THE INVENTION

Field of the Invention

The present invention relates to a method and system for virtual object interaction particularly within an AR/VR environment.

Description of the Related Art

Creating engaging augmented reality (AR) content without extensive software experience is very difficult, especially as the field develops and expectations of users increase. Without engaging a specialized developer, the average content creator is stuck creating old and reused cookie cutter content such as simply putting cat ears on someone's head in a social media chat window or face swapping with a friend on a predownloaded application. Systems are being developed at a very rapid pace that allow for many varied AR effects to be applied to video content by non-programmers which then allow those users to record video with those effects in place. The systems operate as plugins or templates to existing platforms, such as TikTok and SnapChat. However, the users are creating video content not AR content. Creating AR content, such that creating the templates/plugins themselves is far more difficult.

This is due to when creating AR content, due to the isolated nature of each AR object, if a user wanted to use an object (like a 3D image) in more than one AR experience (e.g. a set of cat ears in one template to work in another template together with what is already present in that template), it would be a 'dumb' object with no behavior of its own or awareness of its environment to ensure that the object would not conflict with the environment it is placed in. If a user wanted an object with awareness of its own behaviors and the ability to interact with its environment, and may be customized by the end user, it would need to be captive to a specific AR experience that has already established the other objects and the environment, otherwise adding in a foreign object would create conflict within environments with different rules than the environment the object was designed for. Further, the complexity of the programming does not increase linearly with the number of additional objects, it increases exponentially. This results in AR experiences today being very limited/simple.

Even an experienced developer creating multiple objects for a particular AR environment must carefully create each object and the environment, as well as the interaction between all the objects, each other, and the environment. This makes it very difficult for multiple developers, especially multiple developers that have no knowledge of one another, to create separate environments and objects and share them with one another, as if they are all not designed consistently and for one another, the AR environment will not work as intended.

Accordingly, third party content developers (often referred to as modders) are generally unable to participate in a vast amount of AR content and have only very limited participation in the limited content that allows for modifications.

Some improvements have been made in the field. For example, there is an AR system that is an outdoor interactive video game entitled ARBALL that allows for the playing of "invisible soccer" wherein the ball and goals are virtual but played on a real field with real players, which allows for very limited modifications by users (e.g. placing goals, selecting ball location, minor customizations to the objects) by Augaroo, Inc. of 1921 Freedom Dr. Ste 750 Reston Va. 20190.

Further examples of references related to the present invention are described below in their own words, and the supporting teachings of each reference are incorporated by reference herein:

U.S. Pat. No. 8,831,255, issued to Crawford et al., discloses an augmented reality (AR) audio system for augmenting environment or ambient sound with sounds from a virtual speaker or sound source positioned at a location in the space surrounding an AR participant. The sound from the virtual speaker may be triggered by an action of the listener and/or by the location or relative orientation of the listener. The AR audio system includes stereo earphones receiving an augmented audio track from a control unit, and binaural microphones are provided to capture ambient sounds. The control unit operates to process trigger signals and retrieve one or more augmentation sounds. The control unit uses an AR audio mixer to combine the ambient sound from the microphones with the augmentation sounds to generate left and right ear augmented audio or binaural audio, which may be modified for acoustic effects of the environment including virtual objects in the environment or virtual characteristics of real objects.

U.S. Pat. No. 9,292,085, issued to Bennet et al., discloses technology which is described for automatically determining placement of one or more interaction zones in an augmented reality environment in which one or more virtual features are added to a real environment. An interaction zone includes at least one virtual feature and is associated with a space within the augmented reality environment with boundaries of the space determined based on the one or more real environment features. A plurality of activation criteria may be available for an interaction zone and at least one may be selected based on at least one real environment feature. The technology also describes controlling activation of an interaction zone within the augmented reality environment. In some examples, at least some behavior of a virtual object is controlled by emergent behavior criteria which defines an action independently from a type of object in the real world environment.

U.S. Patent Application Publication No.: 2013/0178257, issued to Langseth, Justin, discloses that the system and method described herein may be used to interact with virtual objects in augmented realities. In particular, the system and method described herein may include an augmented reality server to host software that supports interaction with virtual objects in augmented realities on a mobile device through an augmented reality application. For example, the augmented reality application may be used to create and deploy virtual objects having custom designs and embedded content that may be shared with other users to any suitable location, similarly interact with virtual objects and embedded content that other users created and deployed using the augmented reality application, participate in games that involve interacting with the virtual objects, obtain incentives and targeted advertisements associated with the virtual objects, and engage in social networking to stay in touch with friends or meet new people via interaction with the virtual objects, among other things.

U.S. Patent Application Publication No.: 2018/0157317, issued to Richter et al., discloses that the invention relates to a system and a method for haptic interaction with virtual objects. The system of the invention is based on the idea that, for the haptic representation of any virtual three-dimensional object—synchronized with the visual representation—only the tangible haptic characteristics of the surface area of the object at the collision point or the area of contact are important. The haptic display system (morphling) of the invention that displays these characteristics comprises in principle three functional groups, which operate in synchronism with one another and with a visual subsystem. The individual subsystems may be operated statically or dynamically. In dynamic operation, users may change the position and/or shape, for example, of the tactile display by touching it.

With regard to the real-time representation of the three-dimensional data of the user, at least the body part that is interacting with the object, e.g. the hand, must be represented in the visual system; the body part may also be directly visible, as with a head-up display. Ideally, all body parts of the user that lie within the user's field of view are displayed visually. With the synchronized real-time combination in the visual subsystem, users and objects that are actually spatially separated are displayed virtually in a defined spatial proximity. In this virtual representation, the user thus sees himself touching the virtual object. At the time of collision and at the collision point, however, he does not actually interact with the object represented in the visual system, but with a haptic display subsystem, the morphling, in a tactile subsystem which, in the tangible portion of the virtual object, displays the object's haptic characteristics, e.g. its surface condition and shape, synchronized in real time with the visual representation.

The interaction between the at least one body part of the visualized user and the visualized object are represented in the visual subsystem simultaneously with the interaction of the user with the tactile display system, and upon collision of the at least one part of the visualized user with the visualized object, a collision point is determined. The three-dimensional data of the object at the collision point of the at least one part of the visualized user with the visualized object are presented in the tactile subsystem, the haptic element having a surface with structuring that is designed such that the haptic element displays the three-dimensional structure of the object at the collision point based on the captured three-dimensional data of the object, at least in the area of the collision point U.S. Patent Application Publication No.: 2013/0178257, issued to Cronholm, Paul, discloses a VR device (110) comprising a controller (910) configured to: present a Virtual Reality space (120) comprising at least one virtual object (130) being associated with a gesture for executing an action associated with said virtual object (130); determine that the virtual object (130) is in a Line Of View (LOV); and providing a graphical marking (140) of the virtual object (130); wherein the graphical marking includes an indication of the associated gesture.

PCT Application Publication No.: 2010/079876, discloses that the the present invention relates to a system and a method for editing AR (Augmented Reality) content. More specifically the invention concerns the system and the method which enable the AR content to have a physical reaction to an environment or user context by allowing the editing of context information and physical attributes in the attributes of AR content when a user edits the AR content. Therefore, the system and the method enable the editing of more realistic AR content as additional animation editing is not required and realistic content may be augmented. For the purpose, the invention provides the system that comprises: a model loading unit that loads a 3D model to a selected marker; a sensor that senses operation, sound, and light; and a context information producing unit that processes the information inputted from the sensor in order to produce the context information which is supposed to be reflected in the content.

The inventions heretofore known suffer from a number of disadvantages. These disadvantages include but are not limited to: being difficult to use, less inclusive, being time consuming, requiring a powerful system to use, having high failure rates when combining objects from different developers, not allowing a universal object marketplace, requiring coordination between developers, and necessitating high energy and processing usage.

What is needed is a method and system for object interaction that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available methods and systems for object interaction. Accordingly, the present invention has been developed to provide a satisfactory method and system for object interaction.

There may be an improved augmented reality object handling system, which may include one or more of the following: a display device, a camera which may be functionally coupled to the display such that visual data from the camera may be displayed on the display, an augmented reality object, which may include rendering data which may be configured to provide instructions for displaying the AR object on the display, behavior instructions, the behavior instructions may include interaction instructions for how the AR object interacts with visual data from the camera and/or other AR objects, a characteristic interaction broker which may be in communication with the AR object, the interaction broker may load into memory interaction instructions from associated AR objects, may tracks positions of associated AR objects, and may triggers interactions based on loaded interaction instructions, characteristics, and/or tracked positions, the interaction broker may load visual data from the camera, the visual data may be loaded from the camera to the interaction broker through a network, the augmented reality object may include a set of characteristics readable by the characteristic interaction broker, the interaction broker may load into memory the behavior instructions, the augmented reality object may include a set of placement rules, the interaction broker may include a query script which may determines the order in which interactions are triggered, the augmented reality object may include a set of interaction instructions which may be readable by the characteristic interaction broker.

There may be a method for implementing AR content in a computerized system, which may include one or more of the steps of: receiving visual data from a camera, interpreting the visual data by operation of a processor, thereby generating object-relevant visual data, tracking the object relevant visual data on a display device which may be by operation of an object recognition system, receiving augmented reality object data, which may include rendering data and/or associated behavior instructions that may include interaction instructions, loading the augmented reality object data into an interaction broker, resolving interactions by operation of the interaction broker, and displaying resolved interactions on a display device in accordance with the rendering data, organizing simultaneously triggered interactions based on order of interaction, displaying a pair of sequentially resolved interaction triggers as being simultaneous interactions, the steps of receiving the visual data and the augmented reality data are received over a network.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
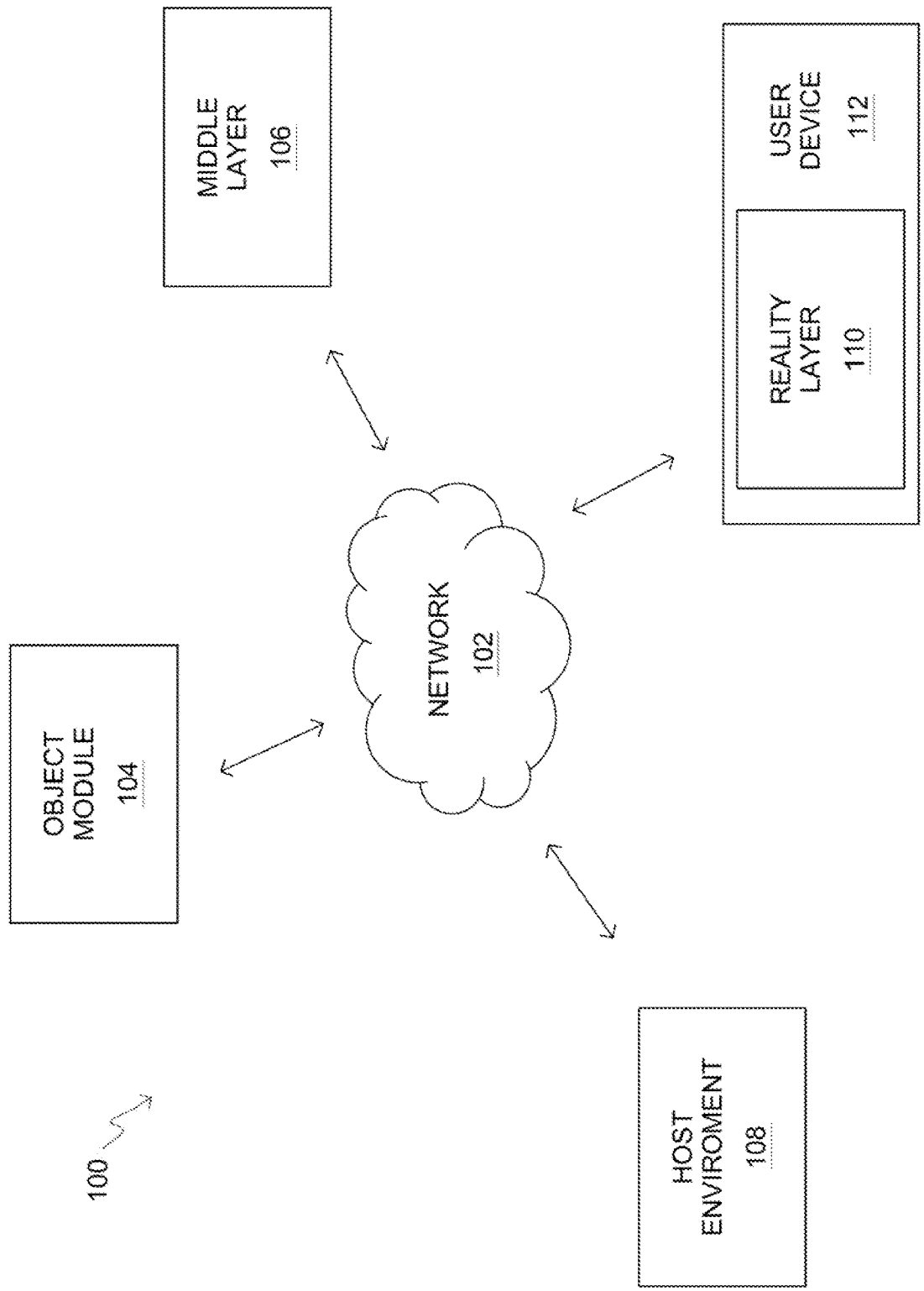
FIG. 1 illustrates an AR system for object interaction operating over a computerized network, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor; a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Android, iOS, BSD, IBM z/OS, Windows Phone, Windows CE, Palm OS, Windows Vista, NT, 95/98/2000, OS X, OS2; QNX, UNIX; GNU/Linux; Solaris; MacOS; and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc. may be realized by any number of hardware and/or software components configured to perform the specified functions.

For example, the present invention may employ various integrated circuit components, e.g., memory elements, processing elements, logic elements, scripts, look-up tables, and the like, which may carry out a variety of functions under the control of one or more microprocessors or other control devices.

Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements.

Further, it should be noted that the present invention may employ any number of conventional techniques for data transmission, signaling, data processing, network control, and the like. Still further, the invention may detect or prevent security issues with a client-side scripting language, such as JavaScript, VBScript or the like and/or Taekion and such blockchain related technologies.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other.

Some non-limiting examples include communicating, sending, and/or receiving data and metadata via: a wired network, a wireless network, shared access and/or decentralized databases, circuitry, phone lines, internet backbones, transponders, network cards, busses, satellite signals, electric signals, electrical and magnetic fields and/or pulses, and/or so forth.

As used herein, the term "network" includes any means electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), satellite networks, networked or linked devices and/or the like. A non-limiting embodiment of a network may include Starlink, manufactured by Space Exploration Technologies Corp. (SpaceX), 1 Rocket Road, Hawthorne, Calif., 90250.

As used herein, the term "network" includes any means of electronic communication which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), satellite networks, networked or linked devices and/or the like. A non-limiting embodiment of a network may include Starlink, manufactured by Space Exploration Technologies Corp. (SpaceX), 1 Rocket Road, Hawthorne, Calif., 90250.

Moreover, although the invention may be implemented with TCP/IP communications protocols, the invention may also be implemented using other protocols, including but not limited to IPX, Appletalk, IP-6, NetBIOS, OSI, IBM SNA, UDP, Google QUIC or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

Data storage systems may include databases and/or data files. There may be one or more hardware memory storage devices, which may be, but are not limited to, hard drives, flash memory, optical discs, RAM, ROM, and/or tapes. The data storage systems may be centralized or decentralized. A non-limiting example of a data base is Filemaker Pro 11, manufactured by Filemaker Inc., 5261 Patrick Henry Dr., Santa Clara, Calif., 95054. Non-limiting examples of a data storage module may include: Google Cloud, by Google LLC, 1600 Amphitheatre Pkwy, Mountain View, Calif. 94043; a HP Storage Works P2000 G3 Modular Smart Array System, manufactured by Hewlett-Packard Company, 3000 Hanover Street, Palo Alto, Calif., 94304, USA; OSTOR by OCHAIN LLC, 75 E. Santa Clara Street, San Jose, Calif., 95113, or a Sony Pocket Bit USB Flash Drive, manufactured by Sony Corporation of America, 550 Madison Avenue, New York, N.Y., 10022.

There may be one or more hardware devices such as a network card, system bus, or wireless internet interface that may communicate with a computerized network. The communication system may provide communication between a wireless device, such as a mobile phone and/or wearable devices including both AR/MR/VR compatible and non-compatible devices, and a computerized network and/or to facilitate communication between a mobile device and other modules described herein. The communication system may have a component thereof that is resident on a user's mobile device. Non-limiting examples of a wireless internet interface may be but not limited to: a internet interface described in U.S. Pat. No. 5,307,463, issued to Hyatt et al.; a satellite constellation described in U.S. Pat. No. 9,647,749, issued to Krebs; or a internet interface described in U.S. Pat. No. 6,133,886, issued to Fariello et al., which are incorporated for their supported herein.

The processing system is in communication with the modules and components of the system (and/or other modules described herein) and provides managerial instructions and commands thereto. The source of such instructions/commands may be from one or more other modules described herein and/or through interactions between one or more other modules described herein. The processing system sets parameters and settings for each module and component of the system. Non-limiting examples of a processing system may be a control module described in U.S. Pat. No. 5,430,836, issued to Wolf et al.; or a control module described in U.S. Pat. No. 6,243,635, issued to Swan et al. which are incorporated for their supporting teachings herein. A control module may include but is not limited to a processor, a state machine, a script, a decision tree, and the like.

The user device generally includes a processor or processing circuitry, a random access memory (RAM), data storage devices (e.g., hard, floppy, flash memory, ROM, and/or CD-ROM disk, drives, etc.), data communications devices (e.g., modems, network interfaces, transceivers, cellular network interfaces, etc.), display devices (e.g., CRT, LCD display, AR/MR/VR wearables, etc.), and input devices (e.g., touch screen, buttons, mouse pointing device, keyboard, AR wearables and related technology, CD-ROM drive, etc.).

It is envisioned that attached to the user device may be other devices, such as read only memory (ROM), a video card, bus interface, electro-magnetic data transfer technologies, smart devices, printers, etc. Those skilled in the art will recognize that any combination of the above components, or any number of different components, peripherals, and other devices, may be used with the user device, including variations wherein components are in separate devices. A non-limiting example of this includes AR wearable such as AR glasses, wherein the display is in the glasses, however the processor is in a separate device, such as a phone. The user device operates under the control of an operating system (OS). The operating system is generally booted into the memory of the user device for execution when the user device is powered-on, reset, or otherwise activated. In turn, the operating system then controls the execution of one or more applications. An application, including the OS, may include a GUI, which facilitates interaction of the user with the application. The GUI includes instructions which, when read and executed by the user device, cause the GUI to perform the steps necessary to configure and/or operate the GUI of the application.

These features and advantages of the present invention will become more fully apparent from the following description and appended claims or may be learned by the practice of the invention as set forth hereinafter.

FIG. 1 illustrates an AR system for object interaction operating over a computerized network 102, according to one embodiment of the invention. There is shown an AR system 100 which includes a network 102 in functional communication with each of an object module 104, a middle layer 106, a host environment 108, and a reality layer 110 of a user device 112. Each of the individual modules are connected via the network 102 to the others in a manner that permits data to flow therebetween, as described herein, however in other embodiments, the individual modules may be connected directly to one another or may be integrated together as a single module to permit usage without necessitating connection to a network. The illustrated AR system 100 provides substantially better performance and capability for an AR system when integrating object modules from disparate sources.

The illustrated network 102 includes one or more electronic communications device(s) which incorporate hardware and/or software components, such as but not limited to ethernet ports, network adaptors, wireless cards, cellular cards, wireless network interface controllers, busses, and the like and combinations thereof. The network 102 as illustrated connects the various portions of the AR system 100 over the internet, however in other embodiments, may connect one or more individual portions directly with one or more other individual portions.

Communication among the components in accordance with the present invention may be accomplished through any suitable communication channels, such as, for example, a telephone network, an extranet, an intranet, Internet, point of interaction device (point of sale device, personal digital assistant, cellular phone, kiosk, etc.), internal bus, online communications, off-line communications, wireless communications, transponder communications, local area network (LAN), wide area network (WAN), directly networked or linked devices and/or the like and combinations thereof. An example of a non-limiting embodiment of a network may include Starlink, manufactured by Space Exploration Technologies Corp. (SpaceX), 1 Rocket Road, Hawthorne, Calif., 90250.

Moreover, although the invention may be implemented with TCP/IP communications protocols, the invention may also be implemented using other protocols, including but not limited to IPX, Appletalk, IP-6, NetBIOS, OSI or any number of existing or future protocols. If the network 102 is in the nature of a public network, such as the Internet, it may be advantageous to presume the network 102 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

The illustrated object module 104 is in communication with the network 102 module, and includes variables, data structures, functions, and methods. The object module 104 also includes one or more sets of characteristics, these characteristics relevant to identifying the object module 104 and used to determine the kinds of interactions that the middle layer 106 is watching for by and between objects 104. These characteristics are built into the object module 104 by a developer, however in other embodiments are specified by a user afterwards. The characteristics of the smart objects within the object module 104 are determined on initialization and are triggered by specific trigger examples, however in other embodiments are built right into the smart objects.

The characteristics of the smart objects within the object module 104 include states and behaviors. States include information about the object at a particular time, and this information may be mutable or immutable. States are be stored into fields and variables, however in other embodiments may be stored into only one depending on the program. Using an example of a car as an object contained within the object module 104, a few nonlimiting examples of states may include, but are not limited to: size, weight, color, speed, temperature, engine type, number of wheels and/or type, direction, fuel level, gear, and RPM.

Behavior instructions include what the smart objects do and/or are capable of doing. Behavior instructions are separate from characteristics as behaviors are not a single state the smart object exists in, rather they change the smart object over a predetermined timeframe. Behaviors are separate from interaction instructions as behavior instructions do not require input from anything else in order to operate, they exist and operate whether or not there are other objects within the reality layer. Behaviors are not placement instructions, as they do not take place solely upon placement. Behaviors may be expressed through methods and/or functions.

Using an example of a car as the object module 104, a few nonlimiting examples of behaviors may include, but are not limited to: applying brakes, accelerating, changing gears, reversing, stopping, shutting off and/or turning on, and turning without relying on another object to trigger these changes of states upon the car. General behavior instruction categories may also in include, but are not limited to: changes in movement over time, changes in animation over time, changes in color over time, transforms into a different object over time, and the like and combinations thereof.

Placement instructions determine whether an object may be validly placed within the reality layer, and what the object does upon placement. This may include, but is not limited to limiting placement of objects based on certain tracked items being present within the reality layer, or allowing triggers upon being placed with or sensing another compatible object.

The object module 104 or collection of object modules 104 may be placed into one or more plug-ins to be more easily used within the method and system for object interaction. The plug-ins are software components that may add one or more specific features into an existing program. The plug-ins may be designed and created outside of the AR system 100 and then later integrated in certain situations, if a user or developer desires, otherwise are stored off the AR system 100.

These plug-ins contain the data that governs the smart objects on the object module 104, including appearance and behavior, as well as the necessary runtime plug-in code, which includes only the data needed at runtime to save space and processing power, or additional data in other scenarios. This allows a developer or user to customize the overall system, or their system in general as well as allows other developers to develop assets that may be used within another user's system. The plug-ins also contain a metadata file, which may provide information about the plug-in, including, but not limited to information such as author, price, and date created.

As with the object module 104, plug-ins are created to require user-supplied input for certain customized applications. Some non-limiting examples of information that a plug-in may require may include necessitating the user to input text in order to create a birthday message, requiring the user to draw or otherwise design a path that an object traverses in the digital plane, and/or having the user submit or insert a camera photo for a selfie augment.

The following is a non-limiting example of a few objects combined into a plug-in, to be used in a method and system for object interaction. A digital artist has created some objects, which include 3D art that may be used in augmented reality. These objects include three different wedding cakes, a bag of rice, a fancy limo, and a horse drawn carriage. The artist has also defined the characteristics of the objects, including the behaviors and interactions for each object. The artist then combines both the objects (here the 3D art) and the characteristics (here the behavior and interactions) into a plug-in.

The plug-in also is automatically designed to carry metadata about itself, including size, date of creation, version number, price and other elements that don't necessarily affect its behavior, but help other artists and users gain some insight about it and/or interact with it. There is now a plug-in for each of the three cakes, a container for the rice, the limo, and the carriage, which may be related so that a user has all the required objects and characteristics for a specific AR scene. Now, the user does not need to go searching for additional content, as everything required is contained in the single plug-in. This is also a significant improvement from the laborious alternative of having to design or hire one or more people to design each object and then piece together each object with other designed objects so that the multitude of objects work together seamlessly.

The smart objects and plug-ins are stored on a database which is in communication with the network 102 and is an organized collection of data stored within a computer system, which may include raw data, and/or objects. The database may be one or more of the following, however is not limited to, relational, flat file, hierarchical, object-oriented, network-model, and/or federated. The following are non-limiting examples of databases that may be utilized within the illustrated network 102: XML, NoSQL, NewsSQL, OQL, and SQL. The smart objects and plug-ins remain on the outside database until pulled onto the database of the AR system 100 by a user and/or developer.

The illustrated user device 112 includes data storage, in the form of an integrated on-device hard drive, however in other embodiments, the data storage may include a relational database, a federated database and/or raw storage. The user device 112 may also include storage on the cloud to allow the user device to have no physical onboard storage. The data storage system collects and store data for one or more of the modules/elements of the system, as appropriate to the functions thereof. The data storage system is in communication with the various modules and components of the system over a computerized network 102 and stores data transferred there through. The data storage system stores data transferred through each of the modules of the system, thereby updating the system with up-to-date data. The data storage system securely stores user data along with data transferred through the system.

Data storage systems may include databases and/or data files. There may be one or more hardware memory storage devices, which may be, but are not limited to, hard drives, flash memory, optical discs, RAM, ROM, and/or tapes. In one embodiment, the database may be populated through one or more filtering AIs that are built to actuate identifying words so that the system may cross-reference various tags related to particular line items.

In a separate embodiment, there may be no database, instead there is limited access to data sources (e.g. inventory management systems/accounts), which removes the need for the resource management system to store all of the information required for use. The resource management system instead pulls and provides the data from $3^{rd}$ parties such as the vendors systems. A non-limiting example of this may be that the data is stored and/or transferred by blockchain, and therefore the data is protected from interference, theft, and/or accidental loss and does not require a large resource management system.

The illustrated middle layer 106 is in communication with the network 102 and includes a tracking module (or tracker), interaction trigger rules, a query system, and a concurrency algorithm. The tracking module, interaction trigger rules, query system, and concurrency algorithm each include one or more protocols, rules, and instructions to enable the middle layer 106 to broker the interactions between objects, as well as the interaction between objects and the reality layer 110.

The illustrated reality layer 110 is in communication with the network 102 and is configured to capture the observed reality around a user. The reality layer 110 therefore includes a camera as well as an object extractor, however, may also include, but is not limited to, a processor, a screen, a user interface, data storage, and the like and combinations thereof. Other embodiments may include one or more brain-computer interfaces (BCD or sensory chips along with any necessary devices, a non-limiting example of this is U.S. Pat. No. 9,538,934 to Ang et al., which is incorporated by reference herein.

As illustrated, the reality layer 110 uses a camera from the user device 112 on which it resides. The camera may be a common smart device camera from a phone, tablet, tv, watch, headset, etc., as well as a dedicated camera device such as a webcam, portable camera, or AR/VR device camera. An example of a camera is the iPhone 12's 12MP Wide Camera, manufactured by Apple, located at One Apple Park Way, Cupertino, Calif.

The object extractor includes one or more software protocols to read objects and the corresponding characteristics of those objects. The object extractor also pulls all or portions of those objects as well as one or more of the characteristics of those objects and place them into the reality layer 110. A few examples include the Automatic Object Based Image Feature Extraction by PCI Geomatics, and ImageMagick by ImageMagick Studio LLC.

The illustrated host environment 108 is in communication with the network 102 and includes both hardware and software components in order to host and deploy software necessary to operate the AR system 100 as well as the method and system for object interaction. The host environment 108 is not contained on the user device, rather the user device 112 accesses the host environment 108 over the network, however in other embodiments, the host environment 108 is located on the user device 112. A few examples of various hosting environment types may include, but are not limited to the following options: shared hosting, virtual private server (VPS), dedicated hosting, cloud hosting, and managed hosting.

The hardware of the host environment 108 includes, but is not limited to, servers and databases, while the software of the host environment 108 may include, but is not limited to, files, websites, and backups. The host environment 108 includes details specific to the method and system for object interaction. These details include where an application is stored as well as functions and services essential to managing the application as a whole. The illustrated host environment 108 is responsible for handling the application-specific functions and application management, which saves processing power and physical space on the user device, therefore allowing the user device to run other sections of the AR system 100 more efficiently.

In operation, the AR system 100 allows for a person to easily create and modify AR content, even if the user is not experienced in AR application development or use. An artist, developer, or user accesses the AR system 100 through a user device 112. An artist, developer, or user may design an object for the object module 104 or may access one or more plug-ins and select a desired plug-in and its corresponding smart object or objects and add them to their AR system 100. If the artist, developer, or user already had the desired object, they may choose to forgo the plug-in and select the object or objects on the object module 104. The user then uses the reality layer 110 to capture visual data about the real world through one or more cameras contained on the user device 112. This visual data is then displayed on the screen of the user device 112 such that the user may see it. Afterwards or while capturing visual data about the real world, the user takes one or more desired smart objects stored on the object module 104 and adds them to the reality layer 110.

The reality layer 110 and object module 104 would then communicate to place the selected smart object on the reality layer 110, and then would communicate with the user device 112 to display the selected smart object on the screen of the user device 112. While displaying the selected smart object on the user device 112, the middle layer 106 would read the characteristics and behaviors of the object from the object module 104 as well as read the visual data of the reality layer 110. If there are behaviors and/or characteristics pulled from the object module 104 and/or reality layer 110 which are determined to create an interaction on the smart object or between the smart object and another smart object and/or the reality layer, the middle layer reads the interaction data. The middle layer would then broker one or more interaction on the reality layer 110, and when resolved would return to reading the object module 104 and reality layer 110, in order to determine if there will be more interactions. Accordingly, the AR system allows a user to create an AR experience without necessitating the user to have to specifically program all the objects and interactions themselves.

Advantageously, the method and system for object interaction enables plug-ins to incorporate their own object definitions, characteristics, and behaviors into the object module 104 of the AR system 100 which the AR system 100 may seamlessly read and incorporate regardless of plug-in source. This allows the AR system and the method and for object interaction to be accessible to many developers, artists, and users which enables those various people to all create and use plug-ins and their corresponding properties to any environment that chooses to read those properties, be it different spaces within the system, or even to an entirely different authoring environment built by a third party. Accordingly, the onboard properties of a plug-in make sure it has the most flexible, broadest use lifecycle.

Figure 2:
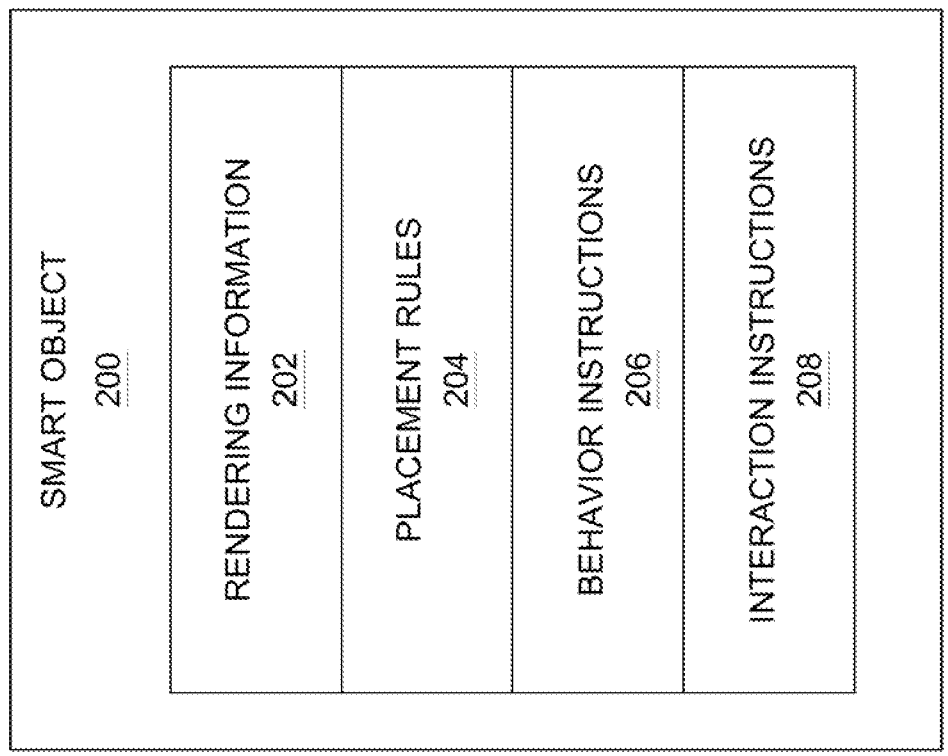
FIG. 2 is a module diagram of a smart object of an AR system, according to one embodiment of the invention.

FIG. 2 illustrates a module diagram of a smart object, according to one embodiment of the invention. There is shown a smart object 200, which includes rendering information 202, placement rules 204, behavior instructions 206, and interaction instructions 208. The illustrated smart object 200 provides independent awareness about their behavior and interaction with their surroundings, which allows a more seamless integration between disparate sources of objects.

The illustrated rendering information 202 includes files to allow for display of a photorealistic or non-photorealistic image from a 2D or 3D model. The files may contain but are not limited to one or more of the following: geometry, viewpoint, texture, lighting, shading information describing the virtual scene, and the like and combinations thereof. Examples of specific file types may include, but are not limited to: JPEG, GIF, PNG, TIFF, PSD, and PSB.

The illustrated placement rules 204 include files to direct the placement of the objects within the environment. These files may include the location of the image or model to render in the digital plane, developer specified path(s) that the object will take in the digital frame, and the reality frame object with which this object may anchor and move. An example of a car object being placed may include placement rules 204 such as that the car will be initially dropped where the user taps or drags the object to, however will fall until the car object hits a road object.

The illustrated behavior instructions 206 include files to instruct the object on what to do within the environment, e.g. default behaviors. These files may include developer specified sound(s) that the plug-in makes, user chosen color(s) for the object, user specified text string(s) to render, and what the object does when the experience is launched. Using the car object example, there may be behavior instructions 206 that may instruct the car to honk, spin the tires, and/or have smoke come out of the tailpipe when the object is placed within the environment.

The illustrated interaction instructions 208 include files to instruct the object on how to interact with the environment and/or other objects. Interaction instructions reference specific characteristics that trigger particular interaction behaviors. Some behaviors are inherent to the object and create interactions without needing any other objects or data to interact with, and some behaviors are from the middle layer reading characteristics between multiple objects and/or other data, such as captured data from the reality layer. These interactions may be achieved by giving objects a property such that when a plug-in collides with another, each may trigger one or more of its interaction scripts through the middle layer.

Scripts query the properties of the colliding object to see what its name is, and then behave appropriately. Interactions may be caused by either tapping or dragging an object, which scripts then determine what the object does when tapped and what script is run when an interaction occurs (e.g. drag and drop, collision with digital plane object, collision with reality plane object).

Using the car object example, there may be interaction instructions 208 inherent to the car object that may instruct the car to begin moving forward once the car hits a horizontal surface after it is dropped into the frame by the user, however, may also have behavior instructions 206 that will stop the car and/or flip the car over if it comes into contact with another car object on the road. There may also be interaction instructions 208 that are not inherent to the car object, however, are brokered by the middle layer such as if there is rain falling, the car has a horizontal surface characteristic such as a hood or roof, and the middle layer has the raindrop burst and then run down the car object upon making contact with the hood or roof of the car object. In some embodiments, there may be inherent and non-inherent interaction instructions acting on a single smart object 200 which conflict, and in these embodiments the middle layer determines which interactions take precedence.

The smart objects 200 and the corresponding plug-ins also contain a number of additional objects and characteristics, including but not limited to, the name of the plug-in, and a globally unique identifier (GUID) that uniquely identifies a plug-in. The metadata files of the plug-in may include, but are not limited to, the name of the plug-in, GUID that uniquely identifies a plug-in, name of the author, date authored, recommended price from the author, and the like and combinations thereof. In some embodiments, there may not be any GUIDs.

The smart objects 200 and the corresponding plug-ins which contain one or more of the objects are collected into additionally, however in other embodiments may instead, contain array-based variables to improve flexibility and extensibility. These array-based variables accept zero to many different arguments instead a fixed number of arguments. Even the properties themselves may be a JSON-like array. This also assists with adding new properties, as they may be added without detracting from or breaking older pre-extended uses. This gives developers a significant amount of flexibility to create or modify new objects and/or plug-ins.

Figure 3:
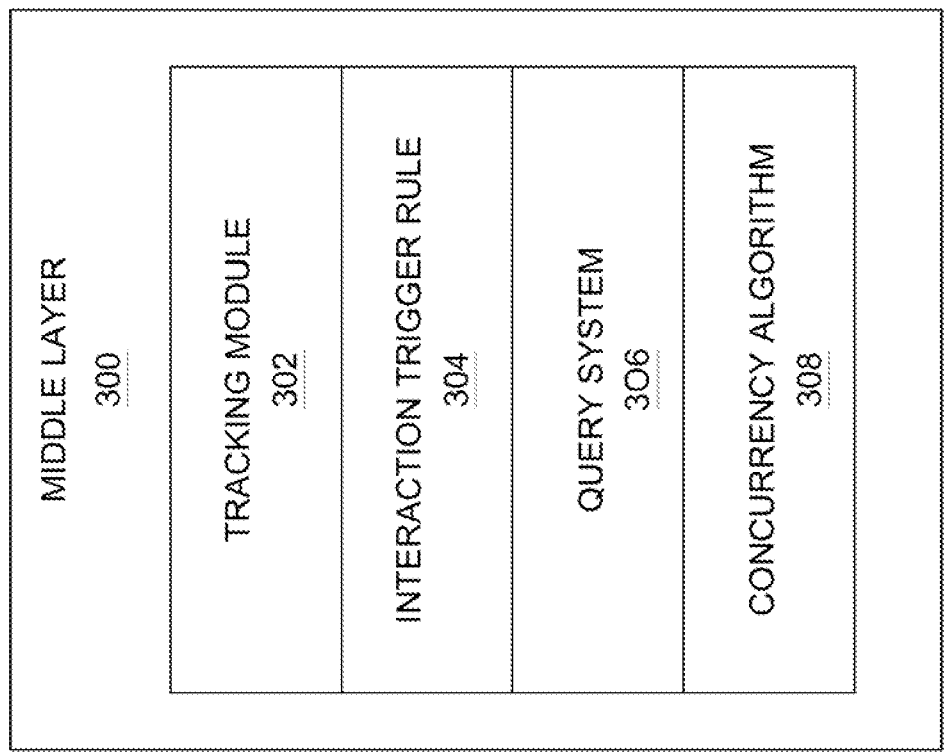
FIG. 3 is a module diagram of a middle layer of an AR system, according to one embodiment of the invention.

FIG. 3 illustrates a module diagram of a middle layer, according to one embodiment of the invention. There is shown a middle layer 300, which includes a tracking module 302, an interaction trigger rule 304 (also referred to as the interaction rule manager), a query system 306, and a concurrency algorithm 308.

The illustrated tracking module 302 may recognize and track objects from the reality layer. This allows the middle layer 300 to relay back a correct position to drop an object or to create an interaction zone or understand a collision point within the reality layer. As a non-limiting example, there may be created content in the form of a rafting AR game, wherein the road is defined as water. The tracking module 302 would be able to locate the road based on the roads characteristics and then inform the reality layer to paint the road accordingly as running water. The tracking module 302 may also then be able to place a defined raft object within that water and be able to determine if that object collides or otherwise interacts with another object, such as a car driving in the road or another raft object placed in the water.

The illustrated interaction trigger rule 304 will trigger an outcome as defined by the characteristics of an object or the environment when the tracking module 302 determines there has been a collision. Using the rafting AR example, the tracking module 302 pays attention to interactions that may occur if there is an object in the water, such as a car driving in the road may create a wave in the direction it is traveling or when the raft object comes into contact with a car in the road, the interaction trigger rule 304 reads the interaction, such as flipping the raft object upon collision. Other interactions may include colliding with edges of AR content, a non-limiting embodiment including if the raft object drifts to the edge of the water, the middle layer may inform that the raft should stop.

The illustrated query system 306 allows the middle layer 300 to stack, remove, and resolve interactions or placements of objects so that they resolve in the correct order as well as in certain situations, removing conflicting interactions and placements. This is done both with simultaneously triggered interactions and sequentially triggered interactions. Simultaneously triggered interactions may be triggered based on order of interaction or a priority system, while sequentially resolved interactions may be triggered and displayed as being simultaneous interactions. which are triggered based on the order of interaction, as well as sequentially resolved interactions The concurrency algorithm 308 works alongside the query system 306 and enables the middle layer 300 to define and resolve multiple collisions or interactions that occur at the same time so that each interaction or collision is resolved correctly and there are no missed or incorrect collisions or other interactions. The concurrency algorithm may include a set of interactions or interaction types that are indicated to be performed in a manner that makes them appear to the user to be happening simultaneously (e.g. such that two balls rebounding from each other both change direction in the same clock cycle even when their triggers might not be calculated at the same time).

This allows the middle layer to effectively deal with a myriad of situations without ruining the immersion by incorrectly resolving situations. Also, segmenting interactions and querying them within the middle layer 300 allows the reality layer and corresponding user device, as well as or instead the host environment to save processing power for their segment in order to more efficiently provide their portion of the AR content, allowing the AR system to work faster and more reliably than having one segment providing everything.

For example, when a plug-in object registers a drag and drop interaction, it should report the final drop location in relative location to the reality plane and the other objects on the digital plane. An author or programmer creating a plug-in may determine if the last location meets criteria relative to either a digital plane object and/or a reality plane object, and may then choose to execute a script as a result. In this way, the author may create a plug-in that will interact with the outside world (a building) or another digital object.

Take the example of a plug-in of a basketball, whose instructions are to look for any basket-like object in the reality frame (basketball hoop, waste basket, laundry hamper, garbage can, etc. . . . ) When the basketball object is dragged and dropped, if the drop point is at the top of the basket object, the basketball object will execute its onCollision routine with an inBasket boolean set to TRUE. If the basketball object is dropped away from the top of the basket, it will obey gravity until it collides with another object or with a reality-plane object and then execute its onCollision routine with an inBasket boolean set to FALSE. Thus the object "Chooses" what behavior it will have based on its drag and drop location in the reality plane. In either scenario, the middle layer identifies the collision and characteristics and interaction instructions of the objects for the collision and then asks all objects party to the collision to run their onCollision routines, and passes the characteristics of the objects involved in the collision to the other objects.

If the interactionTarget is a website (or UNC), upon registering an interaction, it will attempt to open the UNC in the associated viewer based on OS associated viewer defaults. If none exist, then in a browser. If interactionTarget references another digital object, a message is sent to that object's onAction listener. An onAction routine is basically the listener for a digital object that lets it know it has been interacted with. The contents of the package sent to the listener lets it know if it's a generic moveTo or remove action, or if the package specifies an action that the listener has been instructed to watch for (for example onAction=explode), then that object would run it's 'explode' routine.

Figure 4:
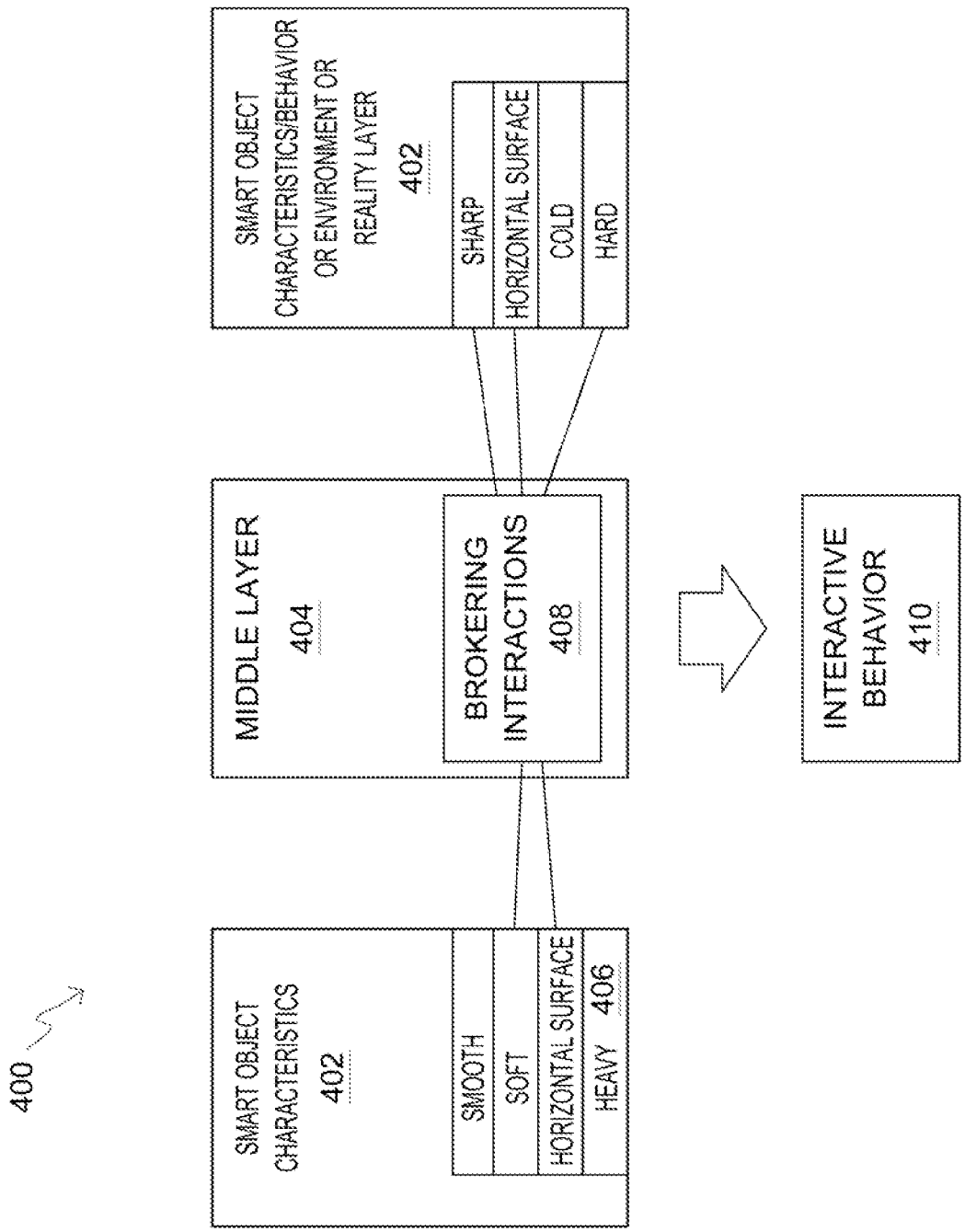
FIG. 4 illustrates the middle layer brokering interactions, according to one embodiment of the invention.

FIG. 4 illustrates the middle layer brokering interactions, according to one embodiment of the invention. The interactions 400 include two smart objects 402, characteristics 406 of the smart objects 402, a middle layer 404 searching for and brokering interactions 408, and resolved interactive behavior 410.

The illustrated interactions 400 are shown as being between two objects 402, however, may be between any number of smart objects, the environment, the reality layer, and the like and combinations thereof. This allows more complex interactions that would not occur due to all interactions not being inherent to the objects, environment, and the reality layer.

The middle layer 404 may in some embodiments ask for particular characteristics 406 to enable particular kinds of interactions, and/or to match certain objects with other objects or environments. These particular characteristics 406 include: AR objects have independent awareness about their behavior and interaction with their surroundings, AR objects have self-awareness and interaction awareness that transcends any specific template or other plug-in, AR objects have awareness is extensible, which means developers may add new behaviors and functionalities without breaking previous implementations of the content object, AR objects may be customized by the end user creating an AR experience with these objects, and/or the structure of the content object reference model allows collections of plug-ins to be created and shared, sold, or deployed as a set.

The middle layer 404 may also include with or substitute for the characteristics 406 behaviors, placement rules, and/or interaction instructions. Some examples may include movements, reactions to collisions, startup animations, and the like and combinations thereof. These may allow the middle layer to resolve pre-defined interactions rather than having to determine interactions and other changes solely based on characteristics.

The illustrated middle layer 404 uses the searched and found characteristics 406 (and/or behaviors) to query and broker interactions 408 between the smart objects 402, thereby creating interactive behavior 410 which may be output on the user device for the user to see any enjoy.

By using a middle layer 404 to broker transactions between plug-ins, templates and the real-world, the following non-limiting example scenarios may be able to be created and enabled:

The Birthday Template might include (among others) the following Plug-ins:
    A biplane that drags a user supplied happy birthday message A UFO that uses a laser to write a happy birthday message
And Fireflies that rotate between showing several messages when tapped. The Biplane Plug-In When the Biplane plug-In is created, it would be given the following properties:

objectName: The name of the Plug-In objectImageArray(1): the location of the 3d object to render in the digital plane.

objectPathArry(2): Developer specified path(s) that the plane and banner take in the digital frame objectSoundArray(0): Developer specified sound(s) that the plane makes while flying objectUserColorArray(2): User chosen color(s) to determine color of the biplane displayUserTextArray(1): User specified text string(s) to render in the banner onLaunch: Indicates what the object does on experience-Launch for example, execute objectPathArray(1), objectUserTextArray(1)

onTapArray(1): Indicates what the object does onTap, for example: execute ObjectUserColorArray(2), objectPathArray(2), objectPathArray(1), ObjectUserColorArray(1)

In this example, when the user chooses the biplane plug-in and drags it to the digital plane, the template (or authoring engine) would recognize that the object contains two User properties, and the system would instruct the user to supply the user-required input. The user would first pick two colors because we specified the color as a user value requiring two inputs, the user would then supply one text string.

When the experience is launched, the plane will follow objectPathArray element 1, with color 1, no sound, dragging text element 1 in the sign behind it. When the user taps on the biplane, it executes the first TapArray instruction set (if there were more than one, it would iterate through on each tap). onTap(1) tells the biplane to change to the second color, execute objectPath(2) (lets say we programmed this to be a loop), then go back to objectPath(1), and go back to the first color.

It is noteworthy that the runtime engine doesn't need to care about any argument except onLaunch and onTap. Those are the only instructions that reference the objects attached to the Plug-In. For example, if we added a plug-in property called completelyMadeUp, no instruction in the above example would reference that, so nothing would happen. Only when completelyMadeUp is referenced by a Plug-In Script would it do anything. In this way, we may be able to add properties that are relevant to only some devices without breaking other devices, which allows for more complex and rich content to be implemented across many devices without necessitating multiple iterations of that content, each specific to a certain device.

Another non-limiting embodiment would be the Firefly plug-in, in which the scenario, when created or used, may give the plug-In one or more of the following properties:

objectName: The name of the Plug-In objectImageArray(1): the location of the 3d object to render in the digital plane.

objectPathArry(4): Developer specified path(s) that the plane and banner take in the digital frame objectSoundArray(2): Developer specified sound(s) that the plane makes while flying objectUserColorArray(0): User chosen color(s) to determine color of the biplane displayUserTextArray(4): User specified text string(s) to render in the banner onLaunch: Indicates what the object does on experience-Launch for example, execute objectSoundArray(1), objectPathArray(1), objectUserTextArray(1)

onTapArray(1): Indicates what the object does onTap, for example: execute objectSoundArray(2), objectPathArray(2), objectUserTextArray(2), objectPathArray(1), objectSoundArray(1)

In this example, when the user chooses the Firefly plug-in and drags it to the digital plane, the template (or authoring engine) would recognize that the object contains User properties, and the system would instruct the user to supply the user-required input, which in this embodiment would be colors. The user would first pick the two colors because the plug-in specified the color as a user value requiring two inputs, in which the user would supply in one text string.

To ensure that the model is extensible, plug-in authors may, when creating the object, add new properties to the plug-in. These new properties may require user input upon content creation or may require other Plug-Ins with which to interact. However, if requiring more than one plug-in in order to deliver an experience, the plug-in developer may be responsible for writing the instructions. It may be possible for an object to spawn the creation of a new object that behaves according to its own properties. This code may live in onLaunch or onInteraction.

Interactions 408 between objects 402 and the real-world may be logged in such a way that the object's real-world usage may be viewed on devices and on servers. It may be beneficial to review the logs to see what users are actually doing with the plug-ins and templates. Also required is interaction start time and interaction end time for the user with any given template.

Figure 5:
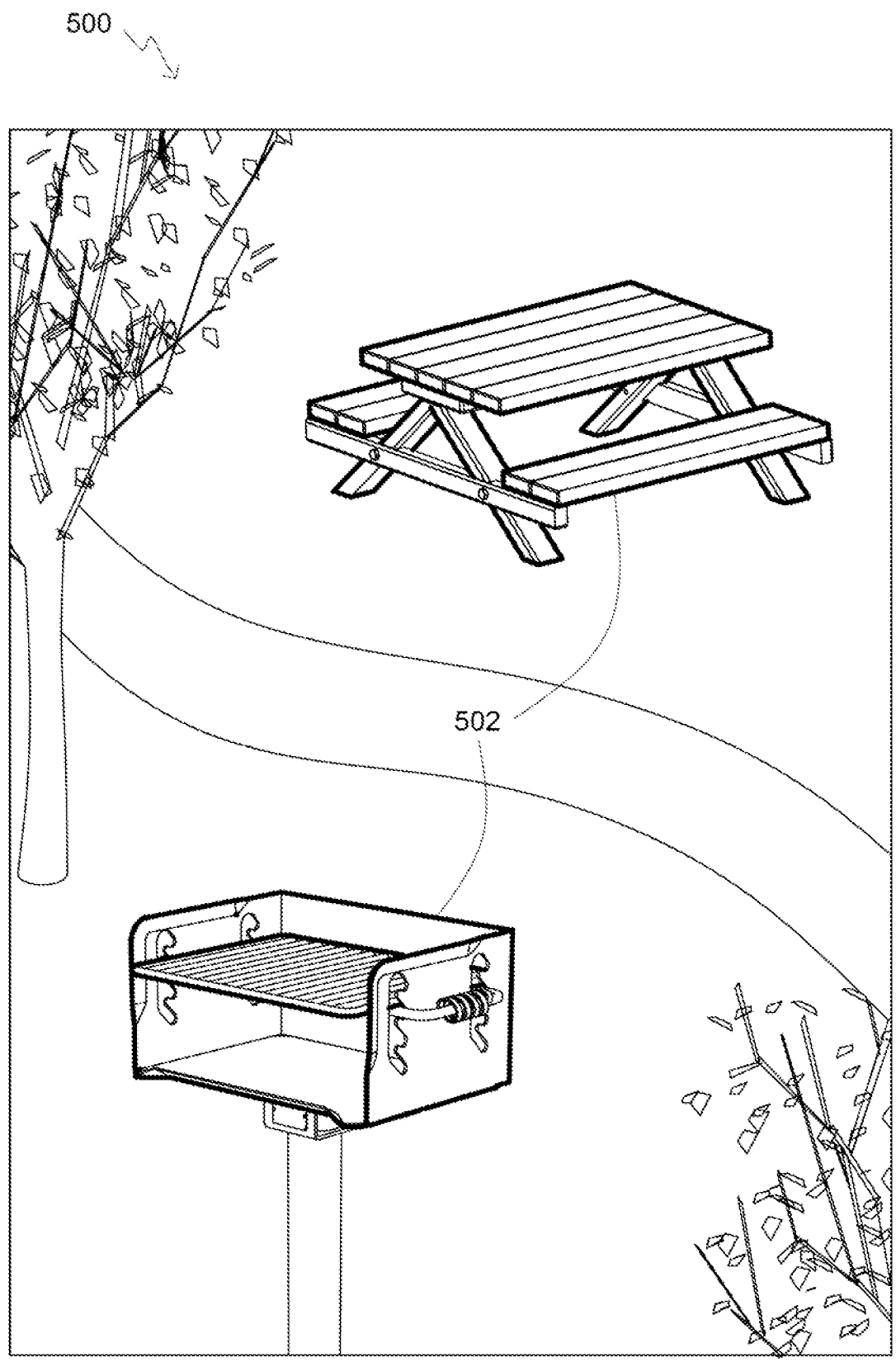
FIG. 5 illustrates a captured template by a user device, according to one embodiment of the invention.

FIG. 5 illustrates a captured template by a user device, according to one embodiment of the invention. As illustrated, the captured visual data 500 includes located and tracked surfaces and objects 502. The visual data 500 is shown captured in a video format wherein the visual data 500 may be continuously live or may move and/or change depending on the time, however in other embodiments, the captured visual data 500 may be in a photo or other still format, or may be sent or downloaded to the user device rather than captured by a camera from it. Further embodiments may have non-real world data or altered real-world data, such as a computer generated image and/or video, photoshopped image, or modified video file.

The reality layer, through the camera of the user device, captures real world visual data 500 to form the basis of the AR display and then displays the captured visual data 500 on the screen of the user device. The AR system also identifies surfaces and objects 502 which the AR system has been set up to locate. As illustrated, the identified surfaces and objects have been signified with higher line weight from the rest of the captured visual data 500, however in other embodiments may be different colors, highlighted, boxed, different line shape, and the like and combinations thereof which allow the user to differentiate found surfaces and objects from non-found surfaces and objects. In other embodiments, there may be no indication that the surface has been found, or the user may have the ability to turn on or off the visible layer showing the surfaces which have been found.

Figure 6:
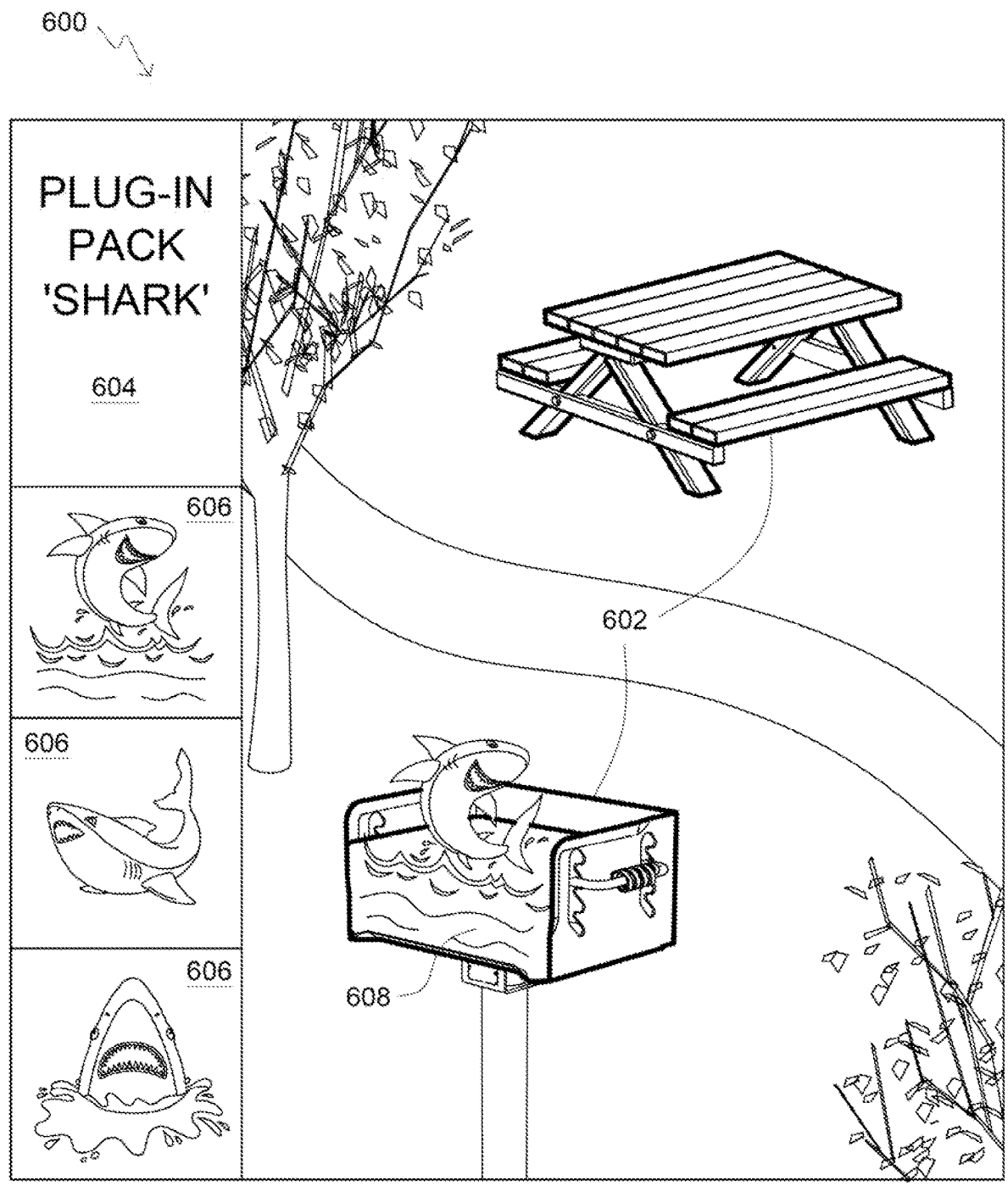
FIG. 6 illustrates a captured template modified by selected plug-ins, according to one embodiment of the invention.

FIG. 6 illustrates a captured template modified by selected plug-ins, according to one embodiment of the invention. The illustrated modified template 600 includes tracked surfaces and objects 602, selected plug ins 604, various smart objects 606 contained within the plug-ins 604, and placed smart objects 608 sitting within the captured visual data.

As illustrated, once or as the visual data is captured, and/or downloaded and shown in the reality layer, the user may pull up a plug-in 604 or plug in pack and place smart objects 606 within the reality layer which may interact with the tracked surfaces and objects 602. Here, the plug-in 602 contains various smart objects 606 shown as sharks.

The plug-in 602 may contain a variety of smart objects 606, which may have different properties and characteristics. As illustrated, the placed smart object 608 includes a water characteristic which fills a tracked surface or object 602 when the placed smart object 608 is placed within a traced surface or object 602 area. Here, the smart object 606 with that characteristic was placed within a tracked object 602 and the water characteristic filled the grill in the placed area, seamlessly filling the section of grill and replacing the grate, while leaving any other sections on the displayed reality layer untouched.

Figure 7:
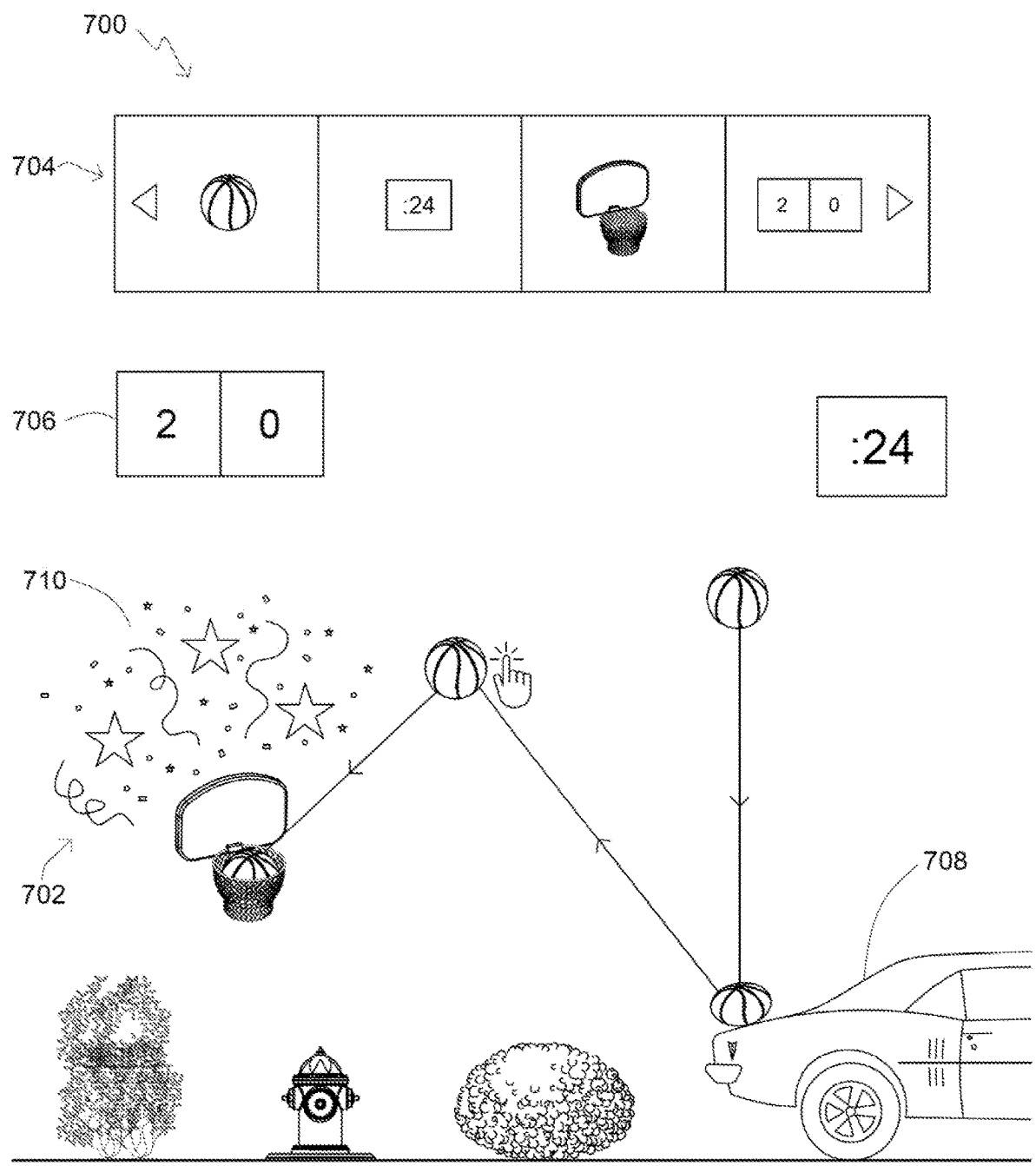
FIG. 7 illustrates an AR game with smart objects, according to one embodiment of the invention.

FIG. 7 illustrates an AR game with smart objects, according to one embodiment of the invention. As illustrated, the AR game 700 includes a reality layer display 702, selectable smart objects 704, placed smart objects 706, real objects 708, and interactions 710.

As illustrated, once or as the visual data is captured, and/or downloaded and shown in the reality layer display 702, the user may pull up a plug-in pack and select from selectable smart objects 704 to drag and create placed smart objects 706 within the reality layer display 702. Once there are placed smart objects 706, the characteristics and behaviors of the placed smart objects 706 are initialized and may interact with other placed smart objects 706 and/or real objects 708.

Here, the reality layer is live video capturing a real-world street, with real objects such as a car, bushes, and a fire hydrant. The interaction broker interprets the visual data from the camera and generates object-relevant visual data from the captured objects. For example, here the outside of the car has been identified and defined as a "hard surface". Further, the interaction broker loads into memory interaction instructions, characteristics, placement instructions, and behaviors with a loader. Therefore, when the interaction broker attempts to broker an interaction between a smart object 706 and the surface of the car, it will match up the "hard surface" characteristic given to the identified real life car with the characteristics of the smart object or objects in order to see if there is a corresponding interaction match.

The placed smart objects 706 include a basketball, a shot clock, a basket, and a scoreboard. The scoreboard, shot clock, and basket are placed and have no initial placement rules or behavior rules until the basketball is placed. Once the basketball is placed, the shot clock has a behavior which notices the placed basketball and the middle layer finds the match between behaviors and begins counting down the shot clock. The basketball has a placement rule which if it is placed above a surface, the basketball will fall until it hits one.

Accordingly, the basketball is placed, the middle layer reads the rule and brokers the interaction by receiving the visual data gained from the camera of the user device, running the visual data through an object recognition system and creating object-relevant visual data. Afterwards, the middle layer compares it to the characteristics and interaction instructions from the smart objects and locations of each to determine if interactions are to take place. When an interaction is to take place, the trigger manager triggers the interaction based on the loaded interaction instructions, characteristics, placement instructions, and/or behaviors. The object recognition system may continuously track the position of the visual data and constantly update the object-relevant visual data in order to react to changes in the visual data captured by the camera.

Here, the basketball falls until it hits the car, which is a real object that has had object-relevant visual data associated with it, the "hard surface" characteristic. The basketball has an interaction rule wherein if it contacts a "hard surface" it will deform to show contact. The basketball also has a behavior where it will bounce the majority of its fallen height if it strikes another smart or real object, 706 and 708, and therefore bounces off the "hard surface" real object 708 car. Further another interaction rule for the basketball is if the user interacts with it. Here, the user taps the screen next to the basketball and the basketball treats the tap as a temporary object and bounces opposite the tap.

Also shown is the hoop and scoreboard, which have their own interaction rules initialized when the basketball is placed. The hoop is shown as shooting out confetti when the basketball makes it into the basket, and the scoreboard changes score when a basket is made. Accordingly, the interaction and behavior rules of smart objects 706 may be as simple or complex as a designer desires.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. An improved augmented reality object handling system, comprising:
 a. a display device;
 b. a camera functionally coupled to the display such that visual data from the camera is displayed on the display:
 c. an augmented reality object (AR object), including:.
   i. rendering data configured to provide instructions for displaying the AR object on the display; and
   ii. behavior instructions, the behavior instructions including interaction instructions for how the AR object interacts with visual data from the camera and/or other AR objects; and
 d. an interaction broker in communication with the AR object, wherein the interaction broker:
   i. loads into memory interaction instructions from associated AR objects,
   ii. tracks positions of associated AR objects, and
   iii. triggers interactions based on loaded interaction instructions, characteristics, and tracked positions, wherein the interaction instructions reference specific characteristics that trigger particular interaction behaviors.

2. The improved augmented reality object handling system of claim 1, wherein the interaction broker interprets visual data from the camera, thereby generating object-relevant visual data.

3. The improved augmented reality object handling system of claim 2, wherein the object-relevant visual data is loaded from the camera to the interaction broker through a network.

4. The improved augmented reality object handling system of claim 1, wherein the augmented reality object includes a set of characteristics readable by the characteristic interaction broker.

5. The improved augmented reality object handling system of claim 1, wherein the interaction broker loads into memory the behavior instructions that are not characteristics or interaction instructions.

6. The improved augmented reality object handling system of claim 1, wherein the augmented reality object includes a set of placement rules.

7. The improved augmented reality object handling system of claim 1, wherein the interaction broker includes a query script which determines the order in whish interactions are triggered.

8. An improved augmented reality object handling system, comprising:
   a. a display device,
   b. a camera functionally coupled to the display such that visual data from the camera is displayed on the display;
   c. an augmented reality object, including:
      i. rendering data configured to provide instructions for displaying the AR object on the display; and
      ii. behavior instructions, the behavior instructions including interaction instructions for how the AR object interacts with visual data from the camera and/or other AR objects; and
      iii. a set of placement rules; and
   d. an interaction broker in communication with the AR object, wherein the interaction broker includes a query script which determines the order in which interactions are triggered, and wherein the interaction broker:
      i. loads into memory interaction instructions from associated AR objects,
      ii. tracks positions of associated AR objects, and
      iii. triggers interactions based on loaded interaction instructions, characteristics, and tracked positions.

9. The improved augmented reality object handling system of claim 8, wherein the interaction broker loads visual data from the camera.

10. The improved augmented reality object handling system of claim 9, wherein the visual data is loaded from the camera to the interaction broker through a network.

11. The improved augmented reality object handling system of claim 10, wherein the augmented reality object includes a set of characteristics readable by the characteristic interaction broker.

12. The improved augmented reality object handling system of claim 11, wherein the interaction broker loads into memory the behavior instructions.

13. The improved augmented reality object handling system of claim 11, wherein the query script includes a concurrency algorithm that includes a set of interactions that are to be displayed as if occurring simultaneously.

14. The improved augmented reality object handling system of claim 13, wherein the iinteraction instructions reference specific characteristics that trigger particular interaction behaviors.

15. A method for implementing AR content in a computerized system, comprising the steps of:
   a. receiving visual data from a camera;
   b. interpreting, the visual data by operation of a processor, thereby generating object-relevant visual data;
   c. tracking the object relevant visual data on a display device by operation of an object recognition system;
   d. receiving augmented reality object data, including rendering data and associated behavior instructions that include interaction instructions;
   d. loading the augmented reality object data into an interaction broker;
   e. resolving interactions by operation of the interaction broker; and
   f. displaying resolved interactions on a display device in accordance with the rendering data,
   g. displaying a pair of sequentially resolved interaction triggers as being simultaneous interactions.

16. The method of claim 15, further including a step of organizing simultaneously triggered interactions based on order of interaction.

17. The method of claim 15, wherein the steps of receiving the visual data and the augmented reality data are received over a network.

* * * * *